(12) United States Patent
Balakrishnan et al.

(10) Patent No.: US 9,729,765 B2
(45) Date of Patent: Aug. 8, 2017

(54) MOBILE VIRTUAL CINEMATOGRAPHY SYSTEM

(71) Applicant: Drexel University, Philadelphia, PA (US)

(72) Inventors: Girish Balakrishnan, Santa Monica, CA (US); Paul Diefenbach, Collingswood, NJ (US)

(73) Assignee: Drexel University, Philadelphia, PA (US)

( * ) Notice: Subject to any disclaimer, the term of this patent is extended or adjusted under 35 U.S.C. 154(b) by 651 days.

(21) Appl. No.: 14/309,833

(22) Filed: Jun. 19, 2014

(65) Prior Publication Data

US 2014/0378222 A1    Dec. 25, 2014

Related U.S. Application Data

(60) Provisional application No. 61/836,829, filed on Jun. 19, 2013.

(51) Int. Cl.
| | |
|---|---|
| *H04N 5/222* | (2006.01) |
| *A63F 13/65* | (2014.01) |
| *A63F 13/213* | (2014.01) |
| *A63F 13/70* | (2014.01) |
| *G06T 15/20* | (2011.01) |
| *A63F 13/5255* | (2014.01) |
| *A63F 13/2145* | (2014.01) |
| *H04N 5/445* | (2011.01) |

(52) U.S. Cl.
CPC ......... *H04N 5/2224* (2013.01); *A63F 13/213* (2014.09); *A63F 13/2145* (2014.09); *A63F 13/5255* (2014.09); *A63F 13/65* (2014.09); *A63F 13/70* (2014.09); *G06T 15/20* (2013.01); *H04N 5/44504* (2013.01); *A63F 2300/1093* (2013.01)

(58) Field of Classification Search
None
See application file for complete search history.

(56) References Cited

PUBLICATIONS

Lino, C. et al. (2011) The Director's Lens: An Intelligent Assistant for Virtual Cinematography. ACM Multimedia, ACM 978-1-4503-0616-Apr. 11, 2011.
Elson, D.K. and Riedl, M.O (2007) A Lightweight Intelligent Virtual Cinematography System for Machinima Production. Association for the Advancement of Artificial Intelligence. Available from www.aaai.org.

(Continued)

*Primary Examiner* — Maurice L McDowell, Jr.
(74) *Attorney, Agent, or Firm* — Saul Ewing LLP; Kathryn Doyle; Brian R. Landry

(57) ABSTRACT

A virtual cinematography system (SmartVCS) is disclosed, including a mobile tablet device, wherein the mobile tablet device includes a touch-sensor screen, a first hand control, a second hand control, and a motion sensor. The SmartVCS including a motion tracking camera configured to track the movements of the motion sensor and generate motion tracking information and a computer operatively coupled to the motion tracking camera configured to receive the motion tracking information and to transmit the motion tracking information to the first mobile tablet device, wherein the first mobile device is configured to overlay the motion tracking information onto a virtual landscape.

19 Claims, 14 Drawing Sheets

(56) References Cited

PUBLICATIONS

Autodesk Whitepaper (2009) The New Art of Virtual Moviemaking. pp. 1-19. Available from www.autodesk.com/film.

Edirlei E.S. de Lima et al. (2009) Virtual cinematography director for interactive storytelling. ACE '09 Proceedings of the International Conference on Advances in Computer Entertainment Technology. Abstract retrieved from [online] dl.acm.org/citation.cfm?id=1690432 [accessed Jun. 3, 2013] Available from: ACM Digital Library. ISBN: 978-1-60558-864-3.

Kneafsey, J. & McCabe, H. (year unknown) Camera Control through Cinematography for Virtual Environments: A State of the Art Report. School of Informatics and Engineering, Institute of Technology Blanchardstown, Dublin, Ireland.

Kneafsey, J. & McCabe, H.(2003-2005) Software Toolkit for Virtual Cinematography. [online] Graphics and Gaming Research Group-Virtual Cinematography, Institute of Technology Blanchardstown. Available from: www.gamesitb.com/cinematography.html [accessed: Jun. 3, 2013].

de Lima, Edirlei E.S., Ciarlini, Angelo E.M. and Feijo, Bruno (2009) Virtual Cinematography Director for Interactive Storytelling. Ace 2009, pp. 263-270.

He, Li-wei, Cohen, Michael F., and Salesin, David H. (year unknown) The Virtual Cinematographer: A Paradigm for Automatic Real-Time Camera Control and Directing.

Christie, Marc and Normand, Jean-Marie (2005) A Semantic Space Partitioning Approach to Virtual Camera Composition. Oxford: Blackwell Publishing (The Eurographics Association and Blackwell Publishing, vol. 24 (2005), No. 3).

MOBILE VIRTUAL CINEMATOGRAPHY SYSTEM

CROSS-REFERENCE TO RELATED APPLICATION

This application claims the benefit of U.S. Provisional Application No. 61/836,829 filed Jun. 19, 2013, which is incorporated by reference as if fully set forth herein.

FIELD OF INVENTION

The embodiments described herein are related to a mobile virtual cinematography system and a method of producing films and game cinematics using commercially available equipment.

BACKGROUND

With development of powerful computer processing equipment and graphic support, virtual cinematography has become a staple of the movie industry. Virtual content is assembled into a scene within a 3-D engine, (e.g. by filming live action elements or through computer generation). Afterwards the scene can be composed, re-photographed, and edited from other angles by a virtual camera as if the action was happening for the first time. The rendered image can appear realistic.

Virtual cinematography with a new virtual camera system has a wide field of applications and opportunities to be useful, ranging at least from film industry, architecture/interior/landscape design studios, city planning offices, video game industries and medical field, for example. However, in the current production environment, the ability to previsualize shots utilizing a virtual camera system requires expensive hardware and large motion capture spaces only available to large studios. There exists a need to develop a new virtual camera system that is more easily accessible in terms of the space, costs, and availability.

SUMMARY

A Smart Virtual Cinematography System (SmartVCS) is designed for both amateur and professional users, who wish to embrace the notion of virtual production for films, game cinematics, designs and medical images without a big studio budget. A user will be able to compose and record camera motions in freespace or in fixed, steady cinema shooting motions, and manipulate scene elements such as characters and environments through a touch interface or hand controls. These interfaces permit previsualizing scenes and shot compositions without the need for expensive hardware or large motion capture volumes. SmartVCS has potential applications to other areas including game level design, real-time compositing and post-production, and architectural visualization.

The SmartVCS, a consumer based previsualization platform as described herein, provides a solution that was developed to make production of virtual cinematics more efficient. Being an open platform device, developers may begin to build on top of the existing virtual production experience, tailoring the software to their production needs and providing a system and method available for both professional and amateur content makers including students, architects, designers, city planners, and medical professionals to small-production teams that cannot afford the cost of studio previsualization tools.

The SmartVCS uses affordable hardware, an intuitive user interface, real-time benefits of game engines, and an intelligent camera system, to provides professional directors as well as a new market of amateur filmmakers the ability to previsualize their films or game cinematics with familiar and accessible technology. The support of both free-space movement and controller-based navigation with adjustable scene scales permits the user to navigate the virtual space and record camera motion in a variety of means. The user can additionally mark key frames for virtual dollies or booms, and control camera parameters such as focal length or aspect ratio. The SmartVCS can include cinematic principals for intelligent generation of shots. For example, dolly tracks and timings are generated based on physically-guided principals in order to produce realistic camera paths. SmartVCS also supports rudimentary scene editing, and has the ability to integrate into a professional production pipeline such as exporting camera paths or scene descriptions with industry software packages such as the one sold under the trademark of Autodesk Maya.

In addition, the system has precision virtual camera controls mapped to analog joysticks, buttons, and scroll-wheel input. With the system's flexible design, operators may modify the form factor of the device through shoulder, tripod, dolly, and hand-held mounts A virtual cinematography system (VCS) is disclosed herein. The virtual cinematography system may comprise: a first mobile tablet device including a touch-sensor screen, a first hand control, a second hand control, and a motion sensor; a motion tracking camera configured to track and record movements of the motion sensor and generate motion tracking information to navigate a virtual camera; and a computer operatively coupled to the motion tracking camera that is configured to receive from the motion tracking camera data of the motion tracking information and transmit the data to the first mobile tablet device. In this system, the first mobile tablet device is configured to generate and overlay virtual camera images based on the motion tracking information data onto a virtual landscape and produce a virtual motion capture.

In another aspect, a method of producing a virtual motion capture using a SmartVCS is provided. The method may comprise the steps of pre-loading and launching a stand-alone SmartVCS application into a mobile tablet device of the SmartVCS device; tracking a movement of the motion sensor of the SmartVCS device via a motion tracking camera connected to a game console to produce motion information data; transmitting the motion information data from the game console to the mobile tablet device; operating a virtual camera within the SmartVCS application based upon the motion information data so as to navigate the virtual camera in a virtual 3-D landscape according to the motion sensor; and recording a virtual motion capture including the virtual camera motion.

BRIEF DESCRIPTION OF THE DRAWINGS

A more detailed understanding may be had from the following description, given by way of example in conjunction with the accompanying drawings wherein.

DETAILED DESCRIPTION OF THE PREFERRED EMBODIMENTS

Figure 1A:
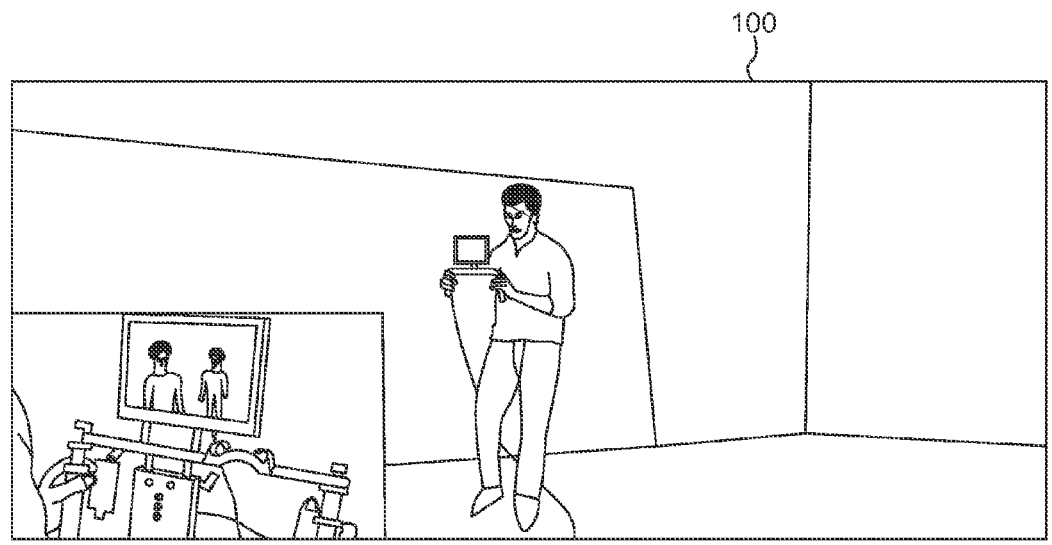
FIG. 1 shows a traditional virtual camera capture in a motion capture studio (1A) in comparison with a SmartVCS motion capture (1B)
Figure 1B:
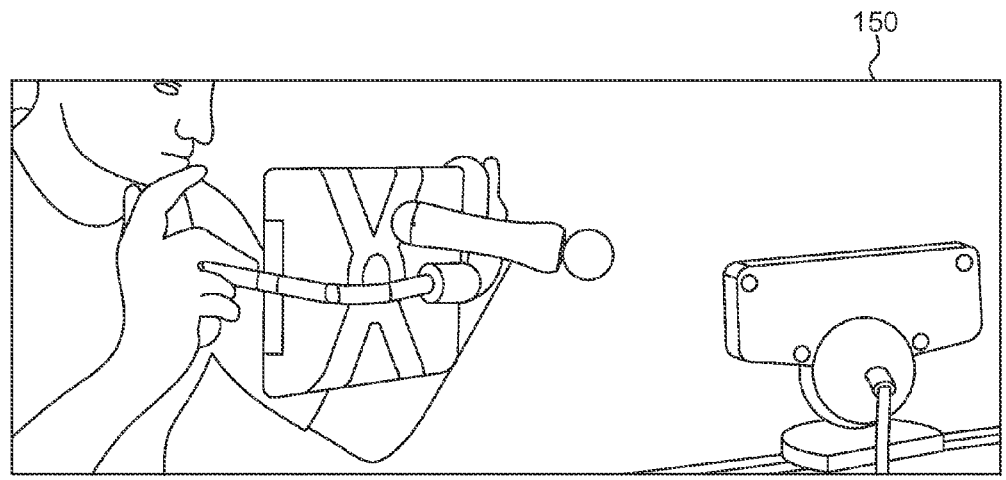

Embodiments will be described with reference to the drawing figures where like numerals present like elements throughout.

Referring to the accompanying drawings, embodiments describe virtual cinematography systems and methods of producing virtual motion captures using a virtual cinematography system. Although elements described hereafter may refer to commercially available devices and products, those are used by way of example only. The system and methods described hereafter may be performed using any appropriate architecture and/or computing environment.

FIG. 1AB show a side-by-side comparison of a traditional virtual motion camera capture in a motion capture studio setting and one aspect of SmartVCS. The traditional system 100 requires large scale studio equipment although modern virtual camera systems, (e.g. Optitrack VCS), require no such equipment or studio settings and provide feedback through four key tracking points which generate the position and orientation of the system by a motion capture camera system. The physical system provides the operator with a visual of the virtual camera position in the manner of an LCD display on the motion camera capture system, which is tethered via a display cable to a computer streaming the motion capture software.

While the above outlines the motion tracking and interface fundamentals required for a traditional virtual camera system, the SmartVCS provides a cinematography solution. To support the intelligence required for a "smart" system, a computing device with logic is provided. The SmartVCS device comprises a dynamic user interface to adapt to different cinematography scenarios such as scene development, shooting, and lighting. In addition, the device includes strong graphical processing power to display complex models, animations, lighting, etc. within a virtual scene.

Figure 2:
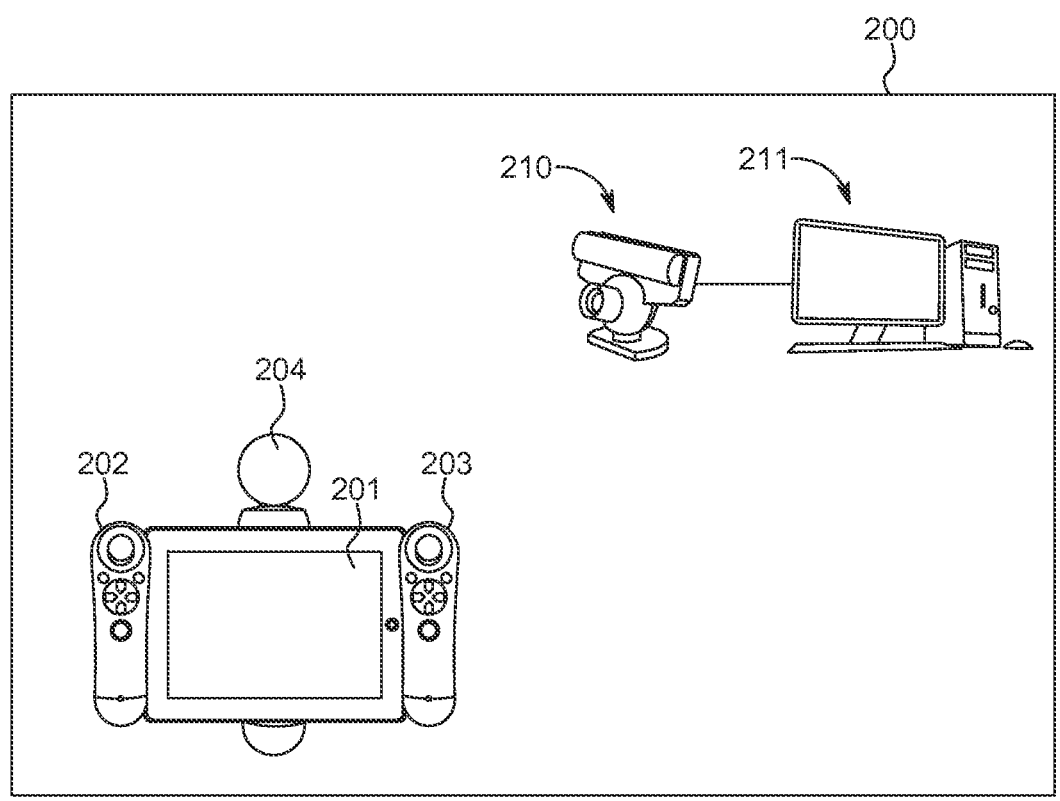
FIG. 2 shows an example SmartVCS system architecture.

FIG. 2 shows an example architecture that can be used by SmartVCS 200. One or more hand controls 202 and 203 are bound to a multi-touch mobile tablet device 201 via a case and are calibrated to stream the position of the tablet device in 3-D space in real-time. Commercially available tablets (e.g. an Apple iPad®) may be used. Beyond simple touch input, tablets allow for fluid user interface design, one that does not rely on a static set of buttons but rather on context sensitive input design. Gestural input control provides users a playground of possibility not limited by analog input. Tablets offer consumers, at an affordable price point, the ability to interact with images through touch while using the evolving 3-D graphical and processing ability of the system.

The SmartVCS 200 also includes a motion sensor 204 bound to the tablet device 201. A camera 210, operatively coupled to a computer 211 tracks the motions of the mobile tablet 201 via the motion sensor 204. Camera 210 follows the motions of the motion sensor 204 and the motion data received by the camera 210 is passed along to the computer 211. Both the mobile tablet 201 and the computer 211 may communicate over a wireless network (not illustrated). The computer 211 and or the mobile tablet 201 may communicate with other computers or other mobile tablets via a network connection (not illustrated).

In the SmartVCS, a standalone app may be pre-loaded into the mobile tablet device 201, and a user is able to build a rapid prototype of a desired scene using the touch-sensor screen of the tablet.

For instance, a game engine sold under the trademark of Unity® can be used as the framework for the standalone app development, but other game engines can also be used. An update-friendly software-based virtual camera system affirms the flexibility and intelligence potential of the SmartVCS, as it allows a user to add further content and functionality to the application, tweak settings based on user preferences, and customize the editing environment.

As the user moves around the space with the SmartVCS device, a virtual camera in the standalone app pre-loaded in the mobile tablet device 201 moves in conjunction, with the tablet acting as a virtual viewfinder into the 3-D world. This immersive experience allows the user to compose and frame shots in real-time shot to block out their camera angles. The system uses custom recording scripts modified from the Object.

Figure 3:
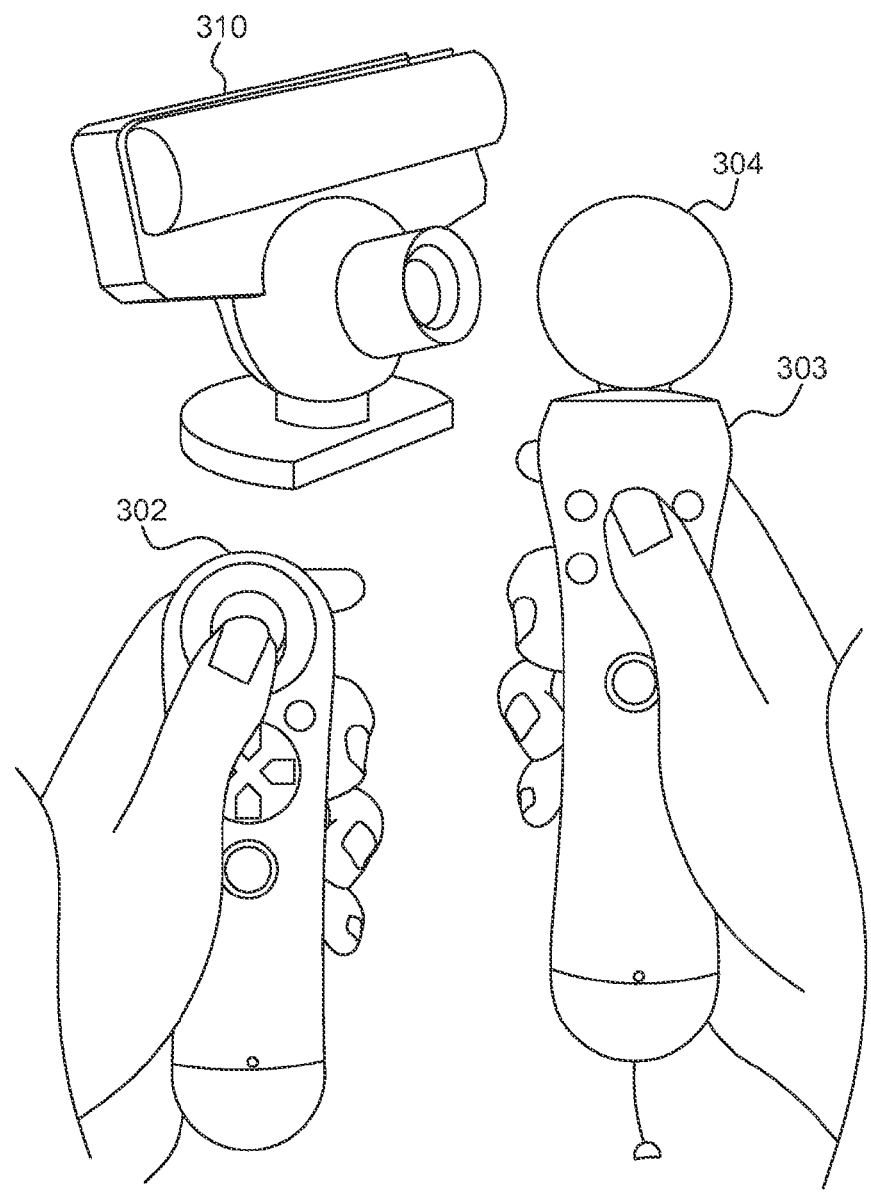
FIG. 3 shows an example hand control, motion sensor, and camera.

FIG. 3 shows a first hand control 302, a second hand control 303 with motion sensor 304, and a camera 310. As one of the characteristics of the SmartVCS, components of a commercially available device can be used. For instance, hand controls, which are wireless input controllers, a sensor and a camera from the game console sold under the trademark PlayStation Move® can be used. The PlayStation Move® system relays to its game console the position of the controllers in real world coordinates based on its relationship to a camera. This level of tracking fidelity allows for the ability to have true low-latency spatial interaction within a 3-D environment. The hand controls (302, 303) are used in tandem with a motion sensor 304 that enables more sophisticated control with its analog stick, buttons, and pressured triggers.

Figure 4:
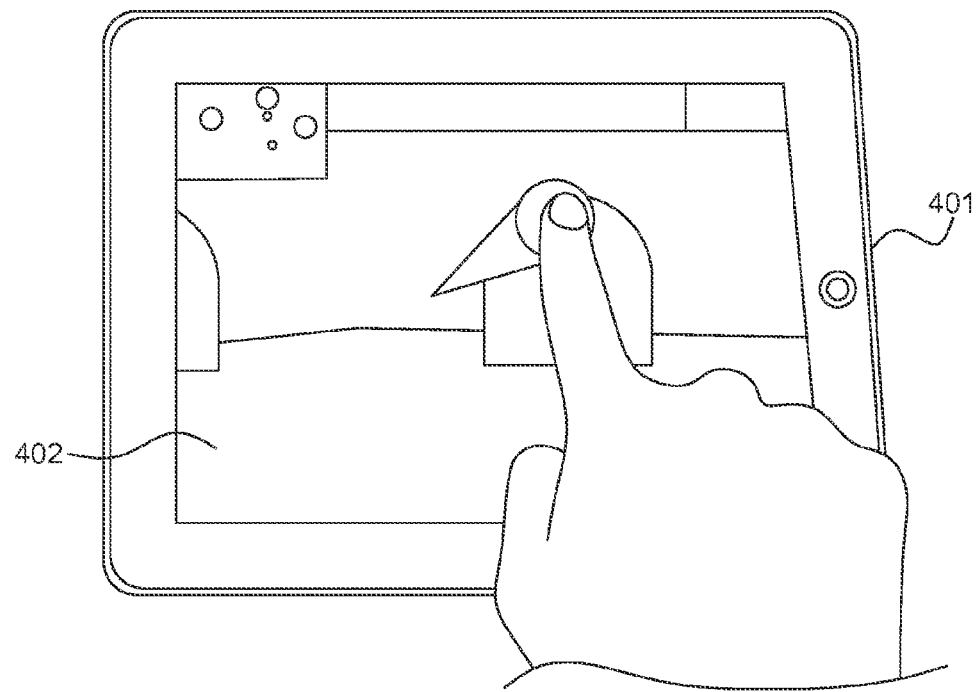
FIG. 4 shows an example of a touch-based virtual camera test.

Referring to FIG. 4, a touch-sensor screen 402 of the tablet device 401 provides a touch based virtual camera test including a full touch-based system for movement, focal-length modification, scene adjustments, and recording/playback.

Figure 5A:
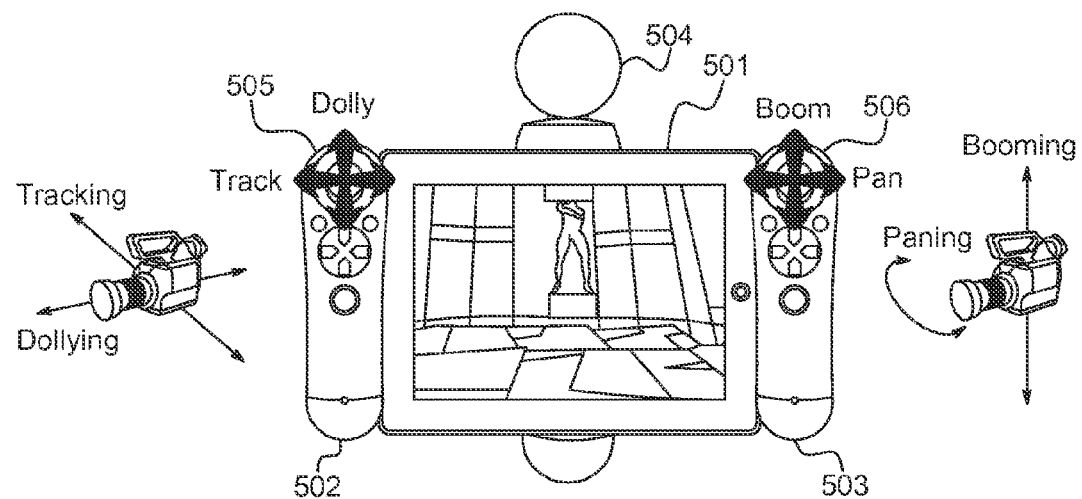
FIGS. 5A-5E show an example of a SmartVCS device.
Figure 5B:
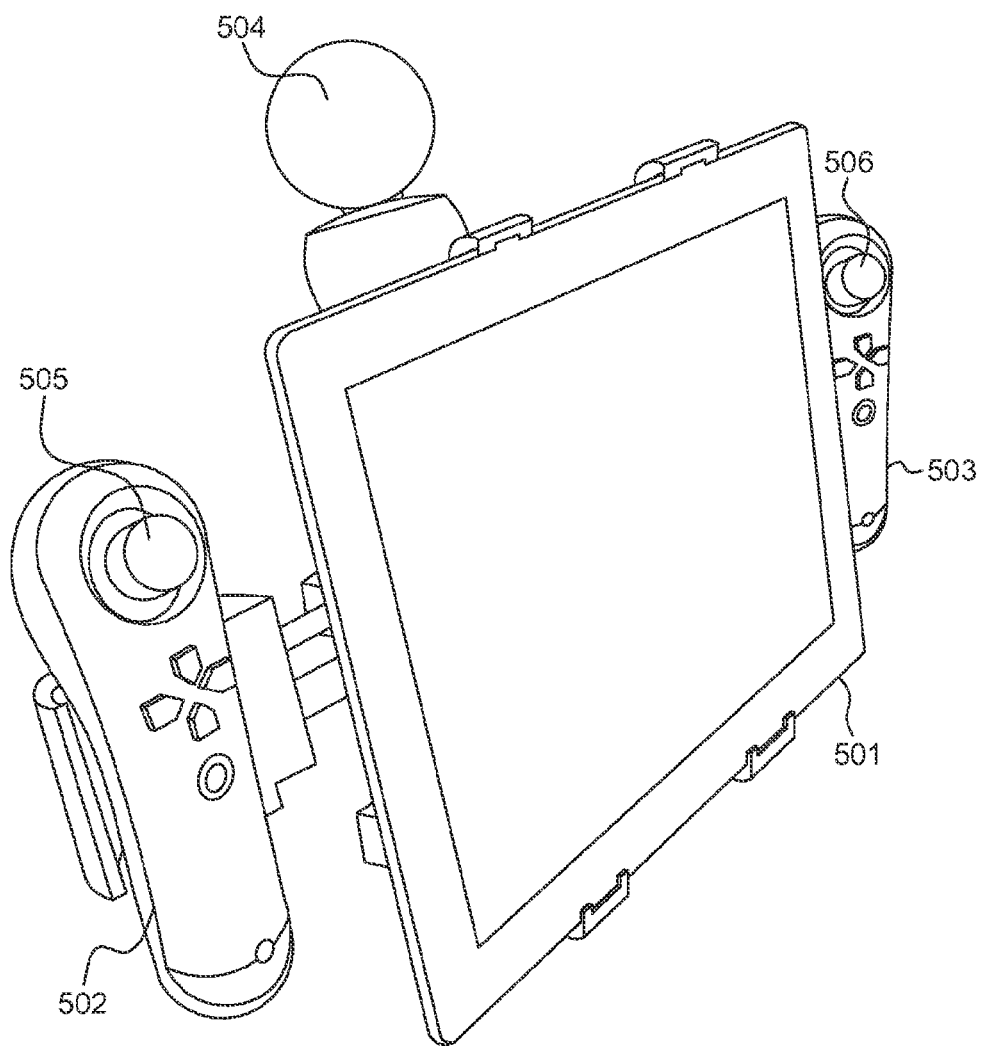
Figure 5C:
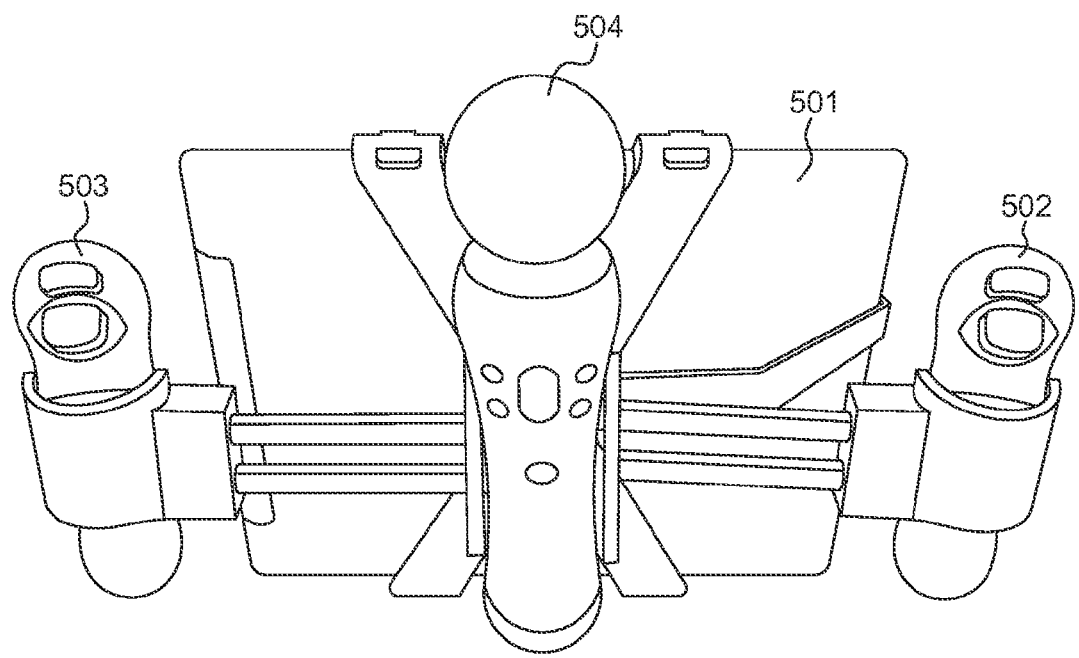
Figure 5D:
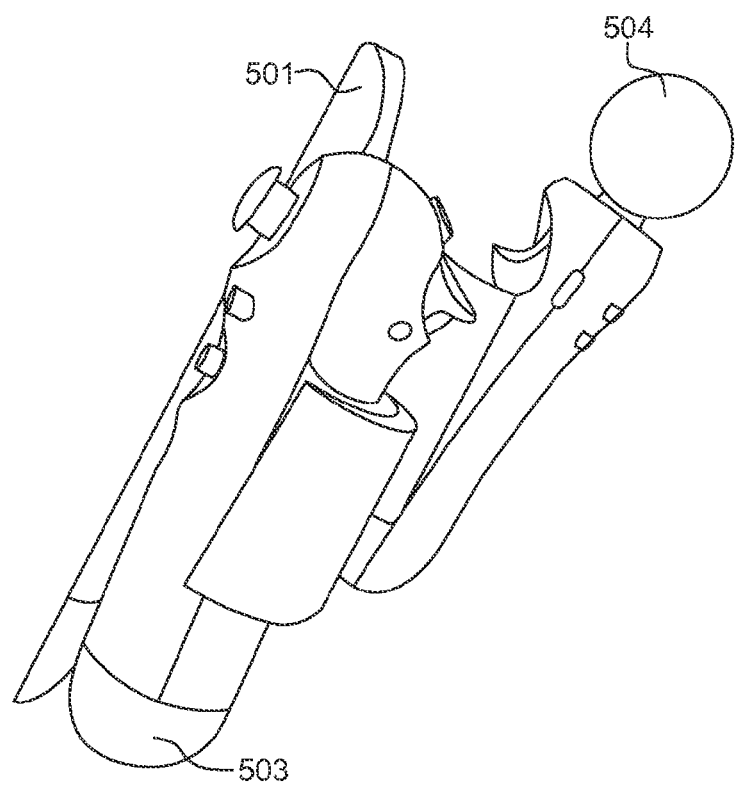
Figure 5E:
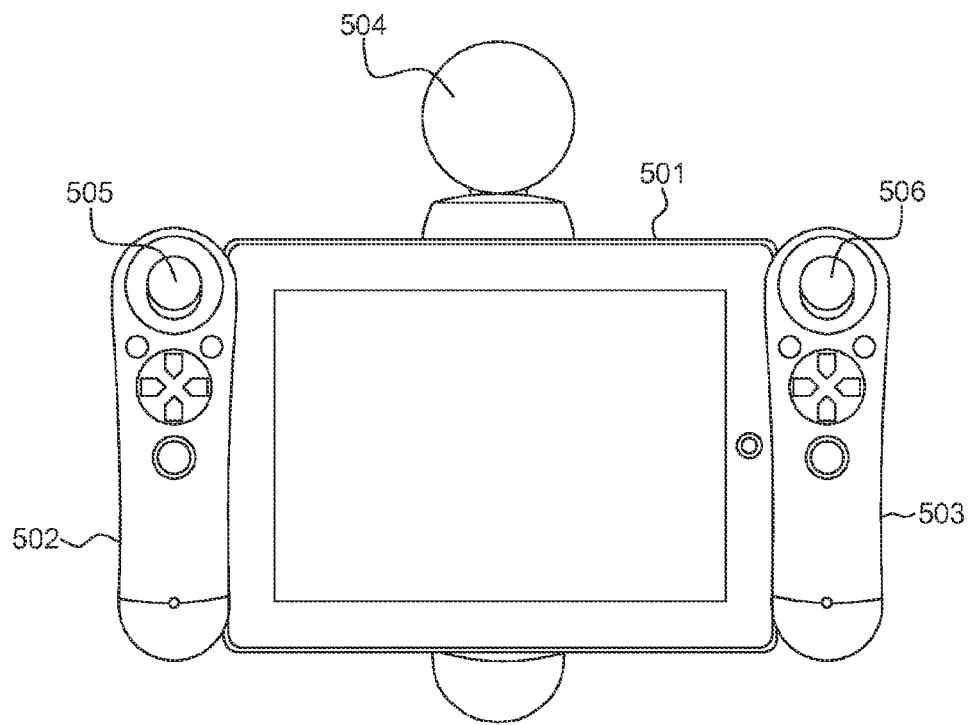

FIGS. 5A-5E show an example of front, perspective, back and side views of the SmartVCS. Referring to FIG. 5A, a virtual camera provided by the SmartVCS with basic camera intelligence functions that abide by the language of cinema is described. The system informs users of basic film principles such as the 180-degree rule and one-third rule while allowing them to select from a set of commonly used shot compositions such as extreme close-up and long shot. In FIG. 5A, as the user begins to prepare to shoot, the use may be able to drop the virtual camera into a 3-D environment and move freely with physical tablet 501 to record several takes of the camera move. The user may be able to review and save the takes that have been approved. The intelligence of the SmartVCS may prevent the user from making film decisions and camera moves that are not ground within what is possible in the real world.

With the SmartVCS, the user is free to maneuver the virtual camera naturally within the tracking volume. With freespace motion, the user is able to pan, tilt, and roll the camera naturally while moving about the space. When users move outside of the camera's visible range, the system automatically switches to gyroscope and accelerometer control for the virtual camera until the tracking sensor is again in the camera's view. Motions made to the system are tracked in the real world and viewed on the tablet display in real-time with no noticeable lag.

Referring to FIGS. 5A-5E, an example of analog hand controls 502 and 503 for operating the virtual camera with the functionality of track, dolly, boom, and pan movements by the navigation controls 505 and 506 is illustrated. The system supports camera tracking, dollying, panning, and booming. In addition, to aid with camera moves such as whip-pans, which require the system to be spun a full 180-degrees, the SmartVCS supports analog orientation control. To extend the capture range of the system, like commercial virtual camera systems, users may use the analog joysticks controllers in tandem with freespace control to move about the 3-D environment.

With these controls, the user is able to navigate across large 3-D spaces without physically moving to that location. This helps establish the starting point for a particular shot. The analog controls 502, 503 are designed to enhance the freespace control with precise input that works similarly to motion-controlled camera rigs used on a live-action set. With both modes of input enabled, the user is able to achieve both handheld (freespace) and steady (analog) shots. With a combination of touchpads and sliders, the user is able to move about the 3-D world with the same standard controls as in first person action games for tablets. The user also has the ability to jump so specific sections of the virtual set by simply tapping on the desired location on an overhead map layout.

Figure 6:
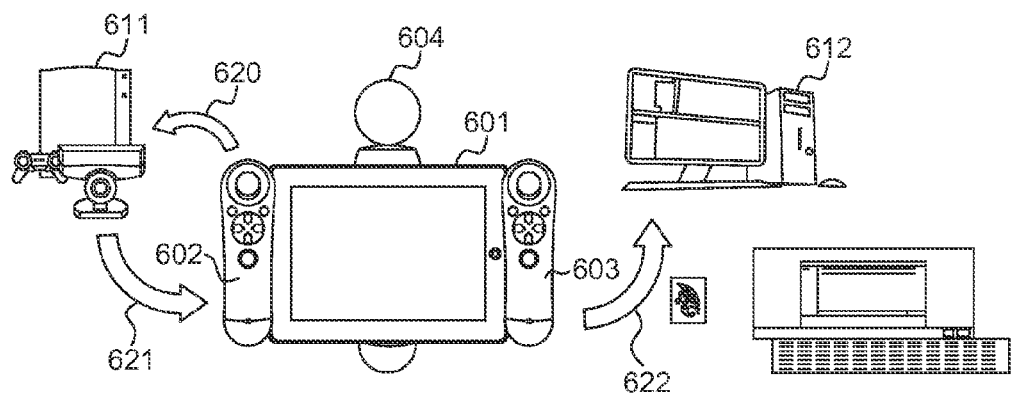
FIG. 6 is a flow diagram of a SmartVCS user experience.

FIG. 6 is a flow diagram of the Smart VCS showing an example method of producing a virtual motion picture by the SmartVCS.

As an example in a prototype, an application entitled "Move.Me®" enables the data of controllers 602 and 603, tracked by a camera 610, to be streamed across a server via direct IP connection. Using the Unity-Move package developed by Carnegie Melon University, the data streamed may be read into the Unity® game engine on a desktop PC. With modifications to make the package mobile-friendly, a game console 611 such as PlayStation®, is able to stream position, rotation, acceleration, and button-input data of each movement operated by a controller directly to a mobile build of the Unity® game.

With the SmartVCS app opened on the mobile tablet device 601, the user is requested to connect the tablet 601 to a server 615 (i.e. Move.Me® server) to begin the real-time stream of data to the app (623). Then, with the app (i.e. Move.Me® app) open on the game console 611 and the controllers 602, 603 calibrated to the game system through a camera 610 such as the PlayStation Eye®, the user may connect directly to the server via direct IP address (624). Now moving the tracked tablet 601 within the capture volume determined by the Eye camera 610 may move the virtual camera within the SmartVCS app.

The combination of these individual pieces of technology with the software is one of the advantages of the SmartVCS according to the present invention. Through a mobile build of the application, the user is able to operate the software using both the touch and analog inputs through the device. The controllers are registered to the Move.Me server with a simple calibration step and are now accessible remotely via IP connection. The SmartVCS app on the tablet 601 connects to the server and receives the spatial coordinates of the controllers 602, 603 as well as button/trigger input of the navigation controller. The Move data is driving the position and orientation of the in-game camera in real-time. The navigation controller is mapped to specific functions including swapping camera lenses, global camera position modification, and record/playback control.

Figure 7:
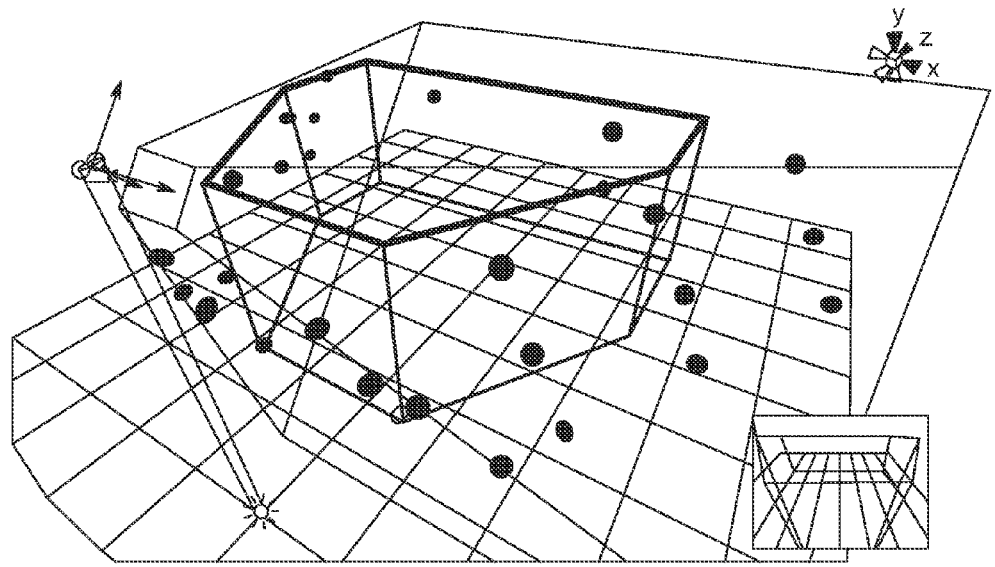
FIG. 7 shows an example of the tracking volume of the SmartVCS.

FIG. 7 shows an example of tracking volume adjustment. In designing a mobile system, it is important to establish the relationship between the physical system and the virtual camera. The tracking volume is considered to be the area within the virtual environment with which the system is able to move within the physical space. For example, in a system with a tracking volume peaking at a 12.5 ft. by 10 ft. play space, the SmartVCS may support controls to modify the planar and vertical tracking sensitivity independently.

Figure 8:
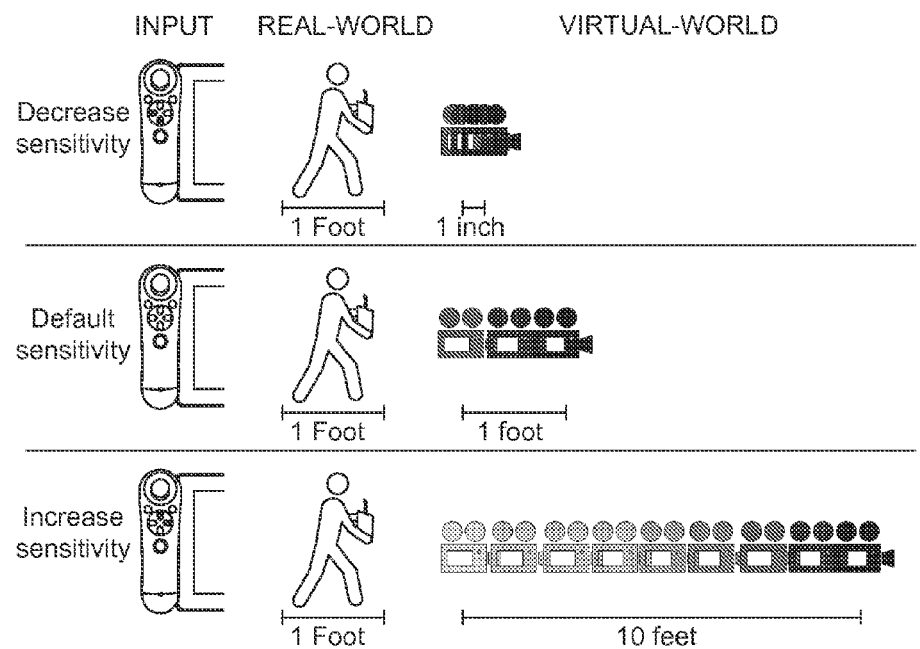
FIG. 8 shows an example of tracking sensitivity real-to-virtual world comparison.

FIG. 8 shows an example of a tracking sensitivity real-to-virtual world comparison. With the controller's directional pad, users may increase or decrease the sensitivity to each axis depending on the desired camera motion. This allows for one step in the real world to become one virtual step under standard conditions, one inch under low sensitivity, and one football field's length under high sensitivity. For example, for tracking shot of a virtual character walking down a hallway, a user may decrease the vertical sensitivity of the camera to smoothly follow the character's horizontal motion. Such techniques are useful in establishing the range of motion of the device for a particular a shot, a practice commonly used in traditional motion capture to pre-plan the motion of the shot. With the sensitivity control feature, the user is able to achieve a greater range of motion within the limitations of the capture volume, and most importantly, is given the freedom to modify these parameters live between and during takes.

Figure 9:
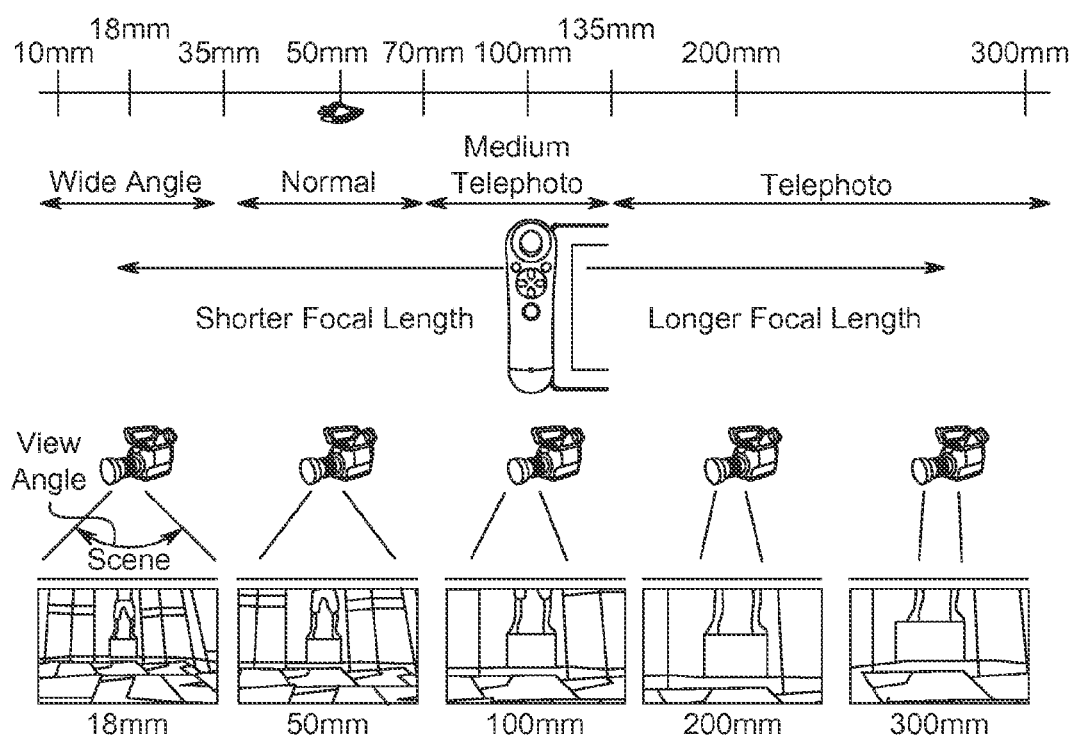
FIG. 9 shows an example of an interface for modifying virtual camera lens.

FIG. 9 shows an example of an interface to modify the virtual camera lenses. On a live-action shoot, camera operators prefer to have a specific set of lenses to swap in and out depending on the shot required, from macro to telephoto. The SmartVCS has made the process of swapping virtual lenses simple with its built-in supply of standard prime lens types ranging from 20 mm-300 mm. Using the navigation controller's face buttons, the user may toggle between these standard lenses with ease and see the real-time feedback through the virtual camera's viewfinder on the tablet display. In addition, the user has the ability to dial in the focal length using the controller's soft-triggers or enter a specific lens value using an on-screen keypad. The system may support prime lens types and may be expanded to feature a full array of industry standard and camera specific lenses.

Figure 10:
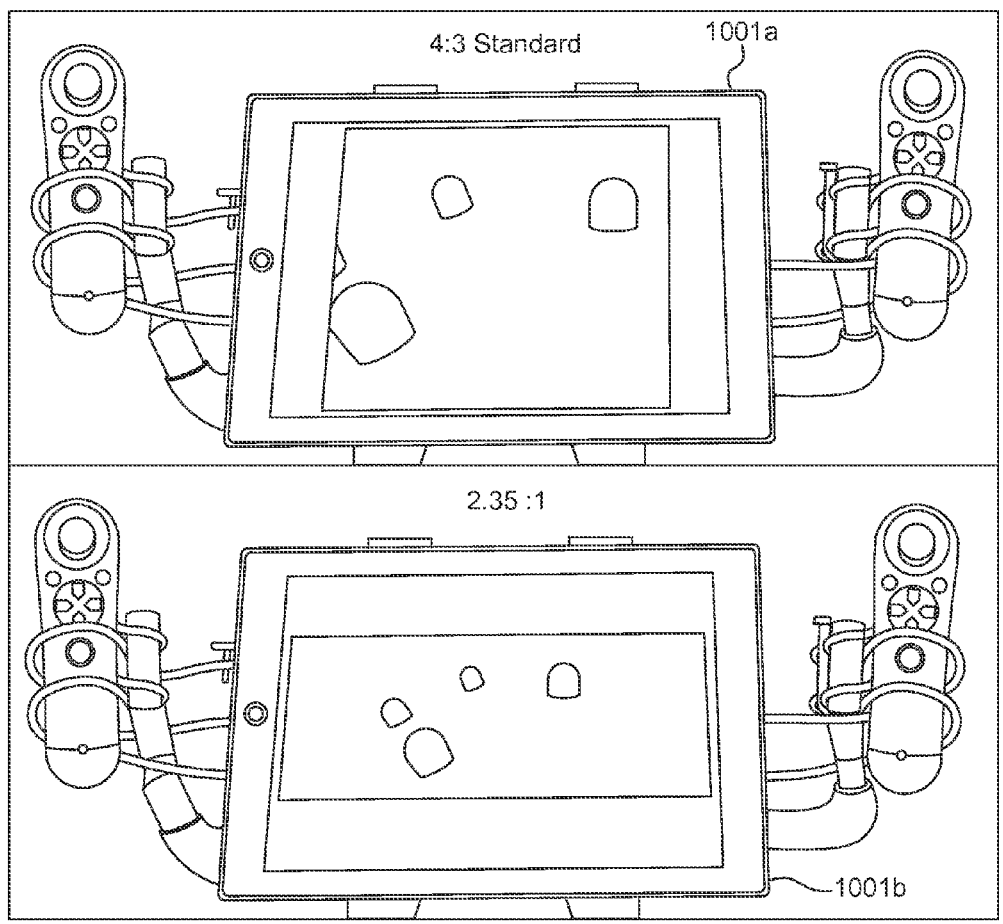
FIG. 10 shows an example of an different aspect ratios for the virtual camera.

FIG. 10 shows an example interface for aspect ratio modification for the virtual camera. Being able to view through the camera lens with guidelines highlighting the film's aspect ratio is a powerful compositional and framing tool for cinematographers. The SmartVCS is able to simulate a variety of standard film aspect ratios including 4:3, 16:9, 1.85:1, and 2.35:1. Beyond simply having access to common aspect ratios, the system allows for an on-screen keypad for custom entry of the desired aspect ratio required for the particular virtual shoot.

Inspired by shot designer's scene modification toolset, the SmartVCS supports real-time modification of scene elements that exist in view of the virtual camera. To move objects within the scene, use the touchscreen to point and drag objects from their original to new position in camera-space. This is helpful for directors who want a 3-D sandbox to manipulate objects around to lay out a scene. In addition, the touch-drag function could be used as a compositional tool to better frame foreground and background objects within a desired shot. This feature may be expanded to include a more robust scene layout builder where new objects may be inserted or removed from the scene.

Traditional motion capture systems require an external operator to move objects on a remote desktop station, disparate from the virtual camera operator on the motion capture stage. Scene modification directly on the SmartVCS system provides directors greater hands-on control of the 3-D environment while they are planning their shot. The SmartVCS supports remote scene modification within a networked sandbox environment.

Another feature of the SmartVCS is freespace spotlight placement in a virtual scene. Lighting, being an integral component of the cinematic process, is a key aspect of the SmartVCS. Users have the ability to choose from a variety of standard virtual lights including point lights and spot lights for their virtual camera. Users may select their light type and use on screen sliders to control cone-angle and penumbra-angle values. With the freespace control, they may actually place the lights in the scene through the physical motion with the system. The desired light is parented to the camera allowing you to move the lights with the same control and flexibility as a Director of Photography may on a live-action set. This precision control of lighting combined with the real-time feedback of in-game shadows provided make the SmartVCS a unique platform for lighting a scene. Further intelligence may be built directly into the system to support standard light kits, colored gels, and more complex lighting setups.

Being able to record, review, and approve multiple camera takes is a crucial component of the virtual camera pipeline. Existing virtual camera systems require an external operator to set the animation clip as well as begin/end the recording. With the SmartVCS, all the recording functionality is built directly into the software.

With the pre-animated scene loaded on the tablet, using the system's shoulder buttons, the user may scrub through the entire animated sequence in real-time. Once the user has determined the appropriate start point of the animation, the scene is locked and the user is now free to frame the camera for that particular shot. With the camera framed, by pressing the designated record button on the Navigation controller, the user is able to use a combination of freespace motion within the capture volume as well as analog joystick input to record a take of the shot.

Figure 11:
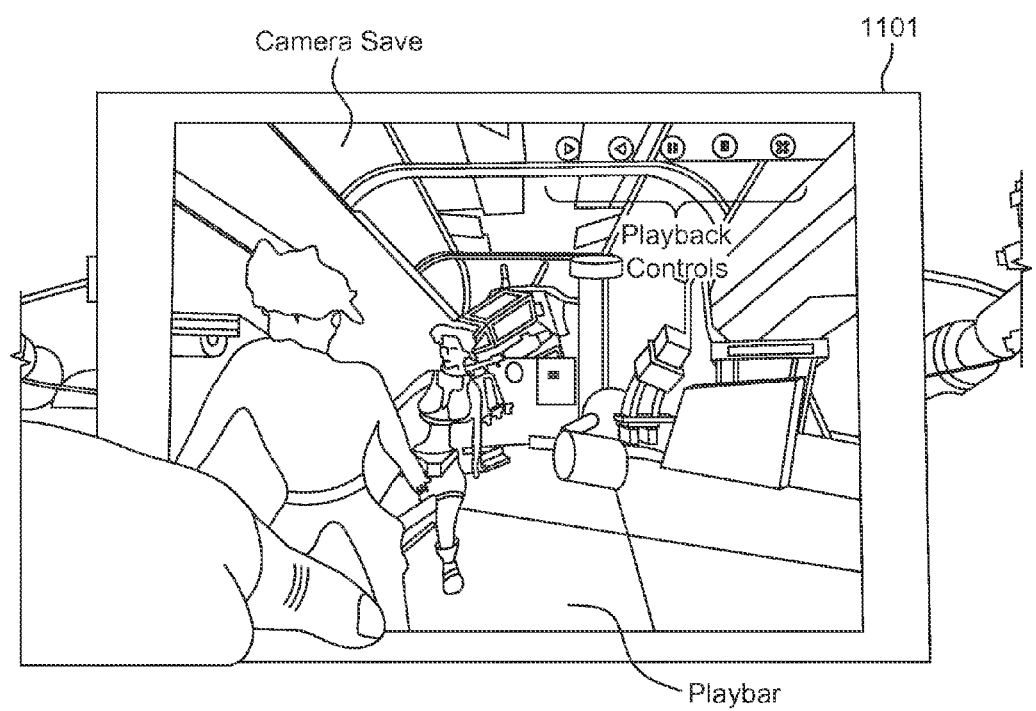
FIG. 11 shows an example of a playback review interface.

After the user has completed the recording, they enter a playback review interface as shown in FIG. 11. In this view, the user has the ability to review the take they had just recorded. Using the same shoulder buttons and touchscreen playback controls, they are able to scrub through the recorded camera and scene animation. If the take is approved, the user may use the touch screen slider controls via the playbar to designate the start and end keyframes of the camera animation. The user has two options to save the recording, as a locally stored rendered video file on the tablet itself and as a text file of keyframe data that may be imported into production software such as Autodesk Maya®. If the take is not approved or the user has completed saving their camera data, they may return back to the 'Live' mode and begin framing their shot for another take.

While visualizing camera moves on the SmartVCS allows users a quick way to iterate through camera moves, advanced users may want to take a captured camera motion path and work with it in post. Within the SmartVCS app is launched, the user has the ability to save multiple approved takes onto the tablet device for motion editing in an external application. Connecting the mobile table (e.g. iPad) and launching an app (e.g. iTunes) enables users access to each camera take via iTunes App File Sharing each take is saved as an individual text file and may be stored with a file name that could take the form of "ShotNumber TakeNumber Date-Timestamp," for example. The text files contain the positional and rotational values of the virtual camera at each frame of the recorded animation. Additional data may be loaded into the text file including, focal length and film aspect ratio.

Industry standard animation applications such as the ones sold under the trademarks of: Maya, 3ds Max, Lightwave, and MotionBuilder support custom written scripts to read external files. A text parser in Maya may read the inputted camera data file received from the tablet, create a new camera with the correct shot code, and assign a keyframe to the camera for each frame of the SmartVCS recorded animation. After loading in the existing scene file, the user is able to see the same camera move achieved on the SmartVCS translated within the desktop 3-D application. From there, users may apply the same advanced motion editing techniques such as keyframe interpolation and frame reduction techniques that may be used with data received from the traditional virtual camera system.

Figure 12:
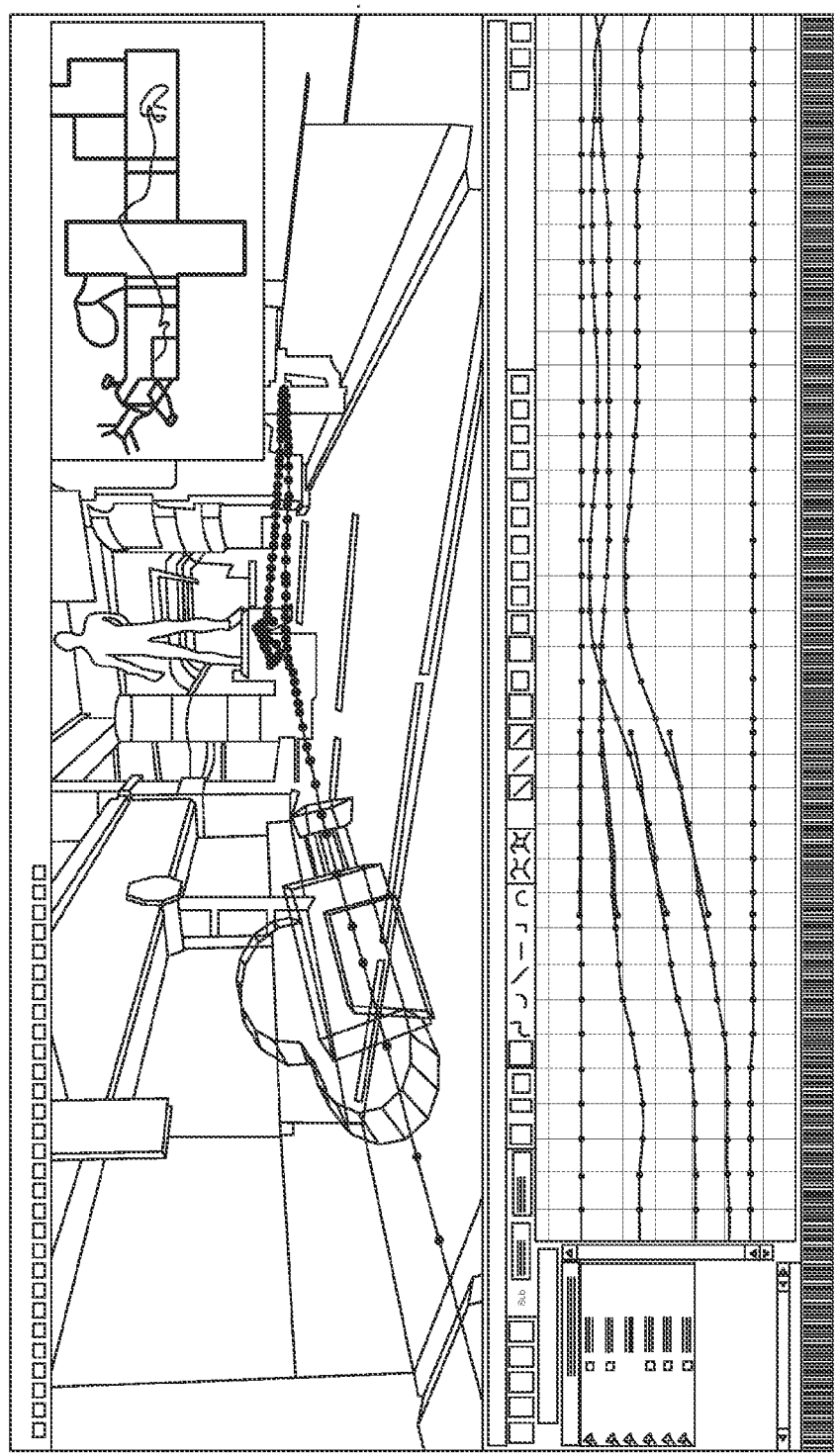
FIG. 12 shows an example of a SmartVCS captured camera data imported into a 3-D computer graphics software sold under the trademark of Autodesk Maya for motion editing.

FIG. 12 shows an example of the SmartVCS captured camera data imported into Autodesk Maya® for motion editing. The SmartVCS may support full recording of the virtual camera's position and rotation information. Based on the settings, all animated objects within the scene, in-scene modifications, and additional camera properties may be recorded or excluded. In one setting, streaming camera position data from the motion sensor and capturing the virtual camera may be set as a priority. In addition, as needed, the aforementioned properties may be scripted to be added to the recorded text file for external software parsing. To support a two directional import and export pipeline of camera data between the SmartVCS and desktop software, a parser may be used to convert software created animated camera motion to a comma-separated text file that may be loaded back into the SmartVCS app.

This is significant because it now extends the captured data from simply existing on the tablet to existing in the user's preferred animation software. With this edited data refined on the desktop, the SmartVCS may load the new keyframe data into the app for review or further alteration.

As a system that is targeted not only to independent developers but novice cinematographers, the SmartVCS supports true virtual camera intelligence with its knowledge of standard cinematic principles. Game engines, uniquely, provide custom scripting opportunities and built-in intelligence that allow the SmartVCS to become a more intelligent and flexible system. Unlike traditional virtual camera systems, the software intelligence may evolve and adapt based on the user's interaction. Through a series of overlays, presets, and head-up displays, amateur users are able to shoot more interesting camera moves with the SmartVCS.

Figure 13:
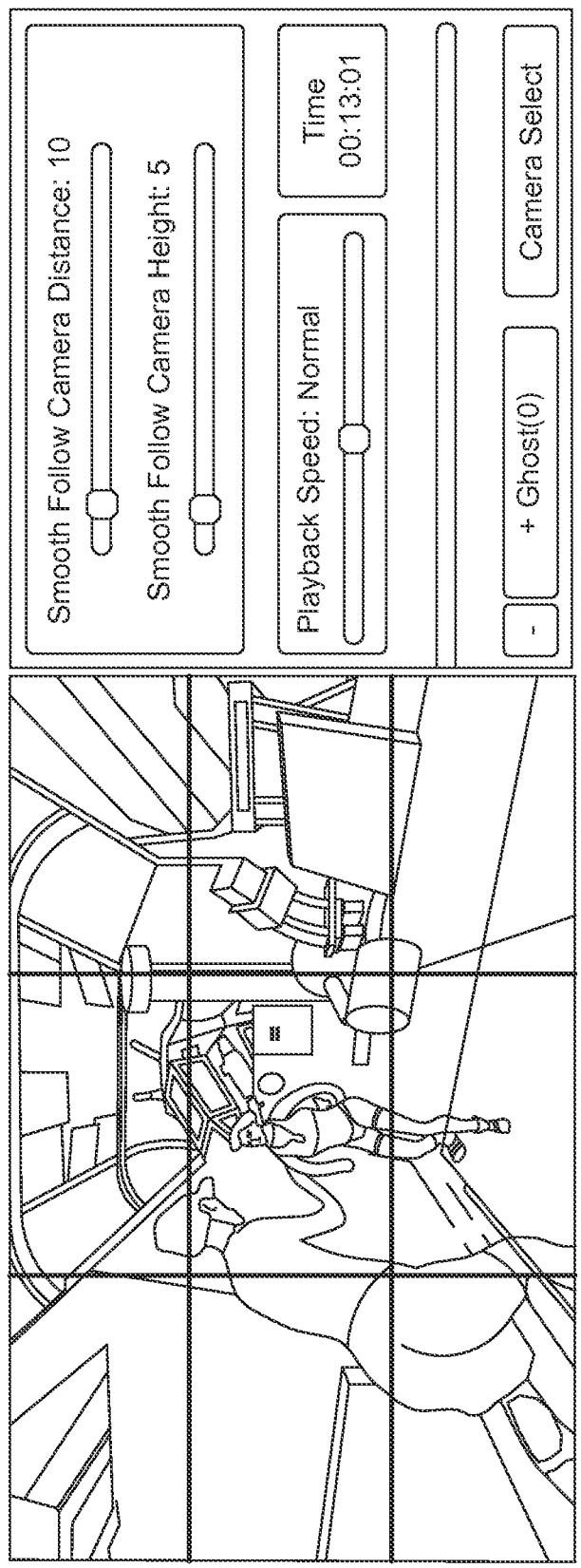
FIG. 13 shows examples of smart grid and camera path smoothing.

Referring to FIG. 13, with its overlay system toggle, the user may receive a "Smart Grid" over similar to the one-third rule grid displayed on most consumer cameras. Beyond a simple GUI overlay, the Smart Grid is able to identify if you have placed characters or environmental landmarks in a visually interesting composition. Since key elements within a scene may be tagged with a certain flag such as "Main Character" and "Landmark", the Smart Grid attempt to align these flagged elements within the camera's view to an area of the Smart Grid that abides by the laws set by the one-third rule.

The SmartVCS also has a lock-on feature, which allows the virtual camera system to intelligently follow a tagged object within the scene. Beyond simply parenting the camera to the object, this feature provides a pre-set list of camera shot types to choose from to best compose the desired shot. These shot types include, but certainly not limited to, wide-shot, medium shot, low/high angle, and close-up. Instead of manually moving the camera about the tagged object, these shot presets provide a starting point to jump start the creative shot compositions for the camera operator. In addition to shot types, the user has the ability to swap between a set of standard camera setups including tripod camera, steadicam, dolly track camera, and crane camera. Each of these constricts the virtual camera in a certain way, like turning off positional motion in tripod mode, to allow the user to focus on composing and shooting the scene.

Other features provide dolly track layout and heads-up display warnings. When entering the dolly track camera mode, the user may be brought to a bird eye view of the scene. In this view, the user is able to use the touch screen to draw a dolly track onto the scene floor.

Based on the chosen camera type, the system allows the user to build a dolly track that is based in real-world standards of dolly rails. This prevents the user from building unrealistic paths that may cause the camera to travel on a jarring path. Leveraging the affordances of a game engine such as collision detection, with the heads-up display system, a warning GUI element may appear on the screen when the system notices an issue with the camera such as if it is intersecting with any geometry or moving in an unnatural motion. While traditional virtual cameras use fuzzy logic to handle shake, the SmartVCS is able to compensate shaky camera motion with a slider that allows the user to stabilize the motion path.

The SmartVCS may enable the virtual camera to begin making cinematic decisions on behalf of the user. Beyond a simple tutorial system that may evaluate the user's setup, play space, and cinematic expertise, the software may adjust to work with the user. In addition, a smart camera may provide recommendations on pre-sets such as accepted camera motions, shot types, etc. giving the user a starting point in which to compose a shot. The SmartVCS may be configured to aid in the creative process of the user. The SmartVCS may automatically generate intelligent camera compositions and motion paths as well as adjust to the user's spatial limitations as they shoot. One of the features of this system is the ability to layer on different levels of intelligence. The SmartVCS provides a toolset for novice cinematographers to take advantage and learn cinematic principles from.

With the use of a game engine in the SmartVCS, intelligence may be scripted to provide guidance and feedback to the user, offering suggestions for improving their traditionally recorded camera motions.

While the system is functional as an intelligent virtual camera system, being a consumer device aimed at an indie market, developing unique features to encourage collaboration among small production teams is another feature.

In production environments, cinematographers often work with directors, layout artists, and supervisors when developing shots. To support this level of multi-user interaction, the SmartVCS supports at least three types of collaborative environments: a multi-camera, directorial, and networked collaboration.

For multi-camera collaboration, multiple SmartVCS systems are supported for simultaneous multicamera control. This opens up possibilities of having different camera operators working together to shoot a single sequence. In addition, this encourages greater experimentation and collaborative exploration within the virtual world coming from two operators who may work together to complete a shot. In a dynamic action sequence, for example, cinematographers may have the luxury of testing out multiple angles of a scene within a single take through this system. Together, the operators may more effectively review many shots and save the best takes for post-motion editing.

Directorial Collaboration, which allows for multiple hand controls, which allows other control devices to act as characters, props, lights, or elements within a scene. The SmartVCS operators may use the camera independent to the function given to other controllers.

For example, two actors may play the role of fighter jets flying through the air, each controlling a move sensor controller and using the controller's trigger and face buttons to fire an array of weapons. The jet models may be parented to each controller independently.

While the actors are choreographing and performing a dogfight scene, the SmartVCS operator may record the scene and direct the performance of the two prop actors. This collaborative experience is unique to this particular system and was previously reserved to larger studios with capture volumes that may fit both actors and SmartVCS operators.

The SmartVCS may also allow for networked collaboration. The SmartVCS is already a networked device, connecting and streaming data directly with the Move.Me® server. In addition to receiving data, the system has the ability to stream content directly from a desktop computer running the Unity Game Engine. Since the SmartVCS was built on top of the Unity engine in one example, it is able to leverage networking functionality supported by the platform and optimized for mobile development. This enables the ability for content within a scene to be streamed in real-time with what is displayed on the tablet screen. This allows for a more familiar production environment to what already exists within motion capture spaces where camera operators are separate from the technicians. Camera operators may call out instructions to the technician to, for example, add additional assets into the level or modify the lighting, all using the familiar mouse and keyboard controls within the game engine interface.

Since the system streaming data to the tablet is an independent system, the computers may use all of the graphics horsepower of a desktop computer to render more advanced scene assets and lighting all within the game engine. This tiered approach allows the SmartVCS to run at a high frame rate and low latency with lower resolution scene assets, while the computers may adjust the quality settings of assets based on the system's specifications.

One key feature that may benefit from this is real-time depth of field. Early experiments of tap-to-focus depth of field modification on mobile proved to lack in real-time performance with camera motion. Since rendering depth of field is a very processor intensive feature, networked collaboration may be used to stream depth information to a more powerful desktop machine for the real-time processing. This may allow the SmartVCS to act as a "focus puller" or first assistant camera operator and lock the focus to an object within the scene, even without the live display preview. The data may then be recorded as a locator and used to drive the depth of field when streamed or exported to a desktop.

Figure 14:
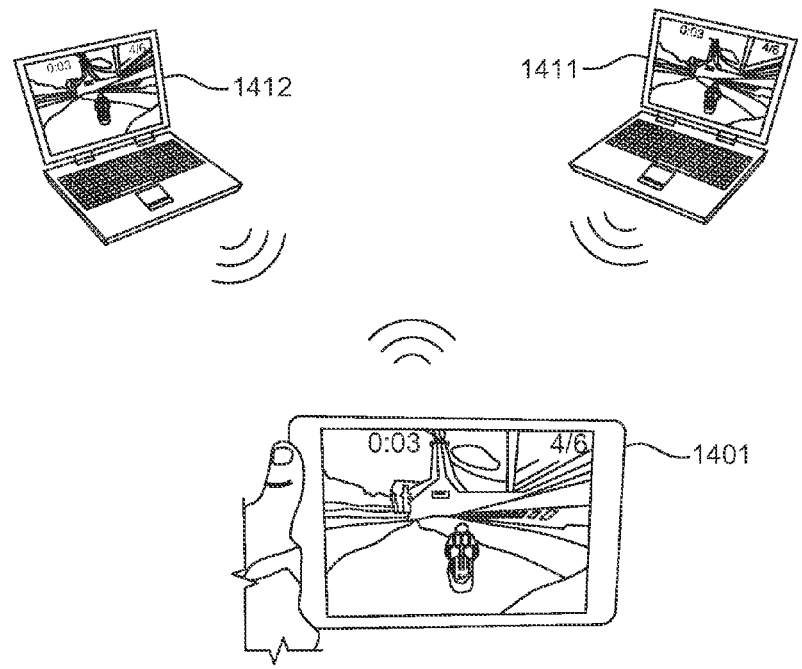
FIG. 14 shows examples of modifying scene elements across a wireless network.

FIG. 14 shows an example interface for modifying scene elements across a wireless network. As shown, the image on the tablet can be viewed on computers that are wirelessly connected. Another benefit of streaming with an independent computer system is the potential for remote collaboration with a technician. Since all the data is being streamed, access to the information required connection to a direct IP address, provided by the camera operator. With this information, a remote computer running the Unity client of the scene is be able to have access and work with the camera operator to help film the shot. In this scenario, a camera operator may be working on a remote studio and a director, who may be in another country filming, may be able to remote connect to the system and view the camera movies and make scene modifications on the fly (see FIG. 14).

While only the aforementioned networking techniques have been explored through the development of this system, SmartVCS was designed to be an open camera capture platform for developers to build an infrastructure that works for their particular studio environment.

The SmartVCS allows cinematographers, regardless of expertise, a tool to develop their desired shot just as they envisioned it. The following discusses the process in which users of the system may be able to compose and record their scenes solely on the device.

Users begin with loading the desired scene within the SmartVCS tablet app and connecting to the Move.Me server. With the system calibrated, the user is now able to make global modifications to the scene, adding and manipulating the objects, characters, so on based on the needs of the shot. Once the scene is developed, the user may use the freespace and analog input of the system to compose the desired shot. Using the built-in intelligence features, such "Smart Grid" (FIG. 13) or the recommendation system, dialog options may appear on the display to suggest shot types, lens configurations, and framing of the shot.

With the core shot framed, the user may now perform a "Range of Motion" to practice the camera motion. In this exercise, the user may, within the tracking volume, perform the physical maneuver required for the shot. In this, the user may be able to make modifications to the tracking sensitivity of the system to achieve the desired motion. On-screen messages may appear if the system detects motions that seem "unrealistic" and make suggestions to best approach the camera motion. Once the move has been finalized and the animation has been cued, the user is now ready to record a take of the shot.

While recording the camera motion, the user still has access to all of the analog controls such as panning and dollying to aid in the final camera motion. After the recorded motion has been completed, the user enters the playback review mode. In this mode, the user has the ability to review the take using the playback controls (play, pause, stop, fast-forward, and rewind) as well as the ability to scrub across a playbar. If the shot is approved, the user is permitted to save the take within the app. If not, the user may return back to the scene to reshoot the take. There is virtually no limit to the number of takes the user may take, thus encouraging the user to experiment with many shot takes.

The SmartVCS, being an mobile tablet-centric device, is able to leverage all the augmented reality innovation occurring on the tablet app space. With the tablet's (e.g. iPad's) high resolution camera combined with the tracking capabilities of the PlayStation Eye camera and the Unity game engine, new opportunities for markerless augmented reality exist with this new capture platform.

The current state of augmented reality requires a tracking marker to be placed in view of the camera and for software to track the position of the marker and replace it with a layer of 2D or 3-D augmentation. While this method is effective, the need to place a physical marker in the environment is a hindrance to the design experience. In addition, latency concerns are common with mobile augmented reality application, often lagging due to having to track the position and render the data onto the screen in real-time. Other solutions that use GPS tracking in combination with a gyroscope to layer on information over a camera is novel, but lacks the freespace positioning accuracy of other devices.

With the SmartVCS, all of the 3-D tracking of the device occurs on the PlayStation 3, freeing up mobile processor space for advanced rendering and interaction. In addition, there is no longer a need for a tracking marker due to the system knowing the exact position and orientation of the device in real-time and in real world space. Possible applications of augmented reality on such an intelligent device include 3-D Integration into Live Video and 3-D Tracking Information in Post.

Figure 15:
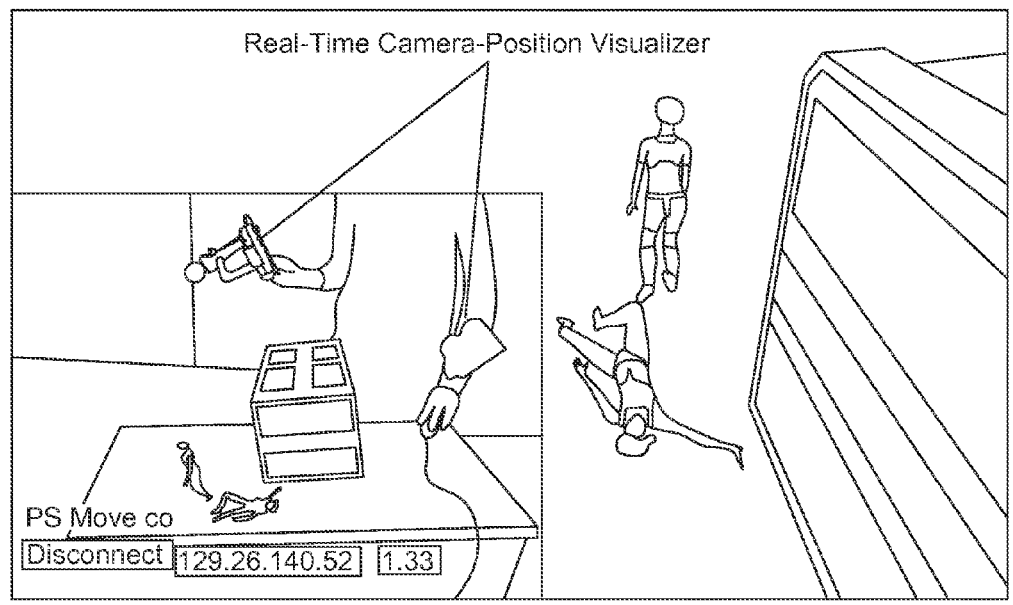
FIG. 15 shows examples of 3-D scene assets and a camera visualizer overlaid on top of a live camera view.

As shown in FIG. 15, another extension of augmented reality on the SmartVCS is the integration of traditional AR marker recognition and manipulation to affect objects in a 3-D scene. In this scenario, the tablet's camera may capture markers placed in the real world. These markers may represent 3-D assets within the virtual world. As these markers were moved, the camera may be able to track the marker's motion and translate the virtual asset respectfully on the tablet display. With this, the user is able to lay out a virtual set with characters as tangible markers in the real world, only to be able to easily move each around to support iterating on a camera shot. With data being streamed and recorded directly onto the tablet, an opportunity exists to overlay aspects of the virtual world within the real-world. The SmartVCS interface may enable a video overlay of the 3-D world over-top a live stream of the camera output on the tablet. With this, the user is able to tell exactly how far to move to complete the shot. This level of immersion marries the real and virtual world in a unique way to aid virtual cinematographers to best maneuver about the world.

With the growth of the tablet videography as a popular mode of capture, the SmartVCS supports the ability to act as a virtual camera for a Match Move solve. Since camera data is captured in real-time in conjunction with the video stream, cinematographers may use the SmartVCS as a 3-D Tracking Tool, similar to the Zeus platform developed by Zoic Studios. With this camera information, the SmartVCS removes the need for any camera tracking/match moving software and operates similar to the several-thousand dollar motion controlled cinema camera rigs.

Considering the camera data includes position, rotation, focal length, etc., bringing this data into any compositing software may create a precise track of 3-D content within a video back plate recorded from the tablet. With the rise of mobile developed films, the integration of tracking technology may enable a new, accessible level of 3-D production previously reserved to matchmove artists. Match moving is a technique commonly used in film where CG characters appear in the real-world, and matchmove artists track 2D camera backplates in a tracking software. With this camera track, matchmove artists are able to integrate 3D objects within a 2D image.

In addition to the features stated above, the SmartVCS may include the following features:

Intelligence: To have a system-built understanding of shot composition, cinematic principles, and film language. Techniques such as line of sight and one-third rule and camera terminology such as film-back, aspect ratio, and lens type are both aspects of intelligence expected in such a system.

Editor: To have the ability to make real-time modifications to scene and camera properties. This may include the ability to import models and animation cycles form an external program, draw out camera tracks before recording, and build basic scene scenarios using a set of pre-built assets for rapid experimentation.

Game Engine: To use a game engine to facilitate in the real-time aspects of the filmmaking process. Leveraging fast computational and graphical systems often attributed to games to make cinematic decisions on lighting, object placement in scene, and camera lens attributes.

Freespace: The ability to move in full six-degrees of directional & rotational freedom. This enables the camera to operate in a capture volume allowing true one-to-one tracking of the system within a computer.

Mobile: To use the latest mobile hardware solutions to develop new touch interfaces for cinematic purposes. Some advantages of using such hardware include portability, network compatibility, dynamic user interface design, and mass market availability.

Collaboration: Taking advantage of the networking of multiple devices and hardware, the system may extend to be used by multiple members of a team. This fosters creativity and encourages the iterative pipeline supported by the virtual production ideology.

Platform: To develop tools that exist as an open framework that may be built upon by developers. No longer does a virtual camera system's software remain static. Every piece of cinematographic functionality described may be modified and updated based on production needs.

The SmartVCS leverages all six of the aforementioned properties in a new hybrid user interface. The system is built on an iPad using the Unity game engine to enable freespace motion via the PlayStation Move tracking system. In addition, the interface of the system includes an editor to build basic scenes from a pool of premade assets and plot out camera moves that abide by film conventions. Based on the research, no system developed thus far is able to capture all these six aspects in one harmonious device.

The SmartVCS may use markerless motion capture solutions that allow up to six Eye cameras to be used in conjunction to expand the volume. The SmartVCS may use a camera-less tracking solutions such as the Leap Motion Controller, where local GPS and wireless magnetic motion sensing to provide effective alternatives.

The SmartVCS comprises a hybrid interface that combines touch and analog control. Alternatively, the SmartVCS may comprise a singular multi-touch tablet device with analog input and motion-tracking technology.

The SmartVCS may be used in cinematography, as well as:

Video Games: Interactive Level Design Creation, Hybrid Freespace-Touch Game Controller Film: On-Set Planning Tool, Real-Time Compositing Engineering/Architecture: Visualization Tool for CAD Models, Machine Input Controller for Robotics Medicine: Robotic Surgery Input Device, Medical Visualization.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although the methods and features described above with reference to FIGS. 1-15 are described above as performed using the example architecture of FIG. 2, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-15 may be used alone without the other features and elements or in various combinations with or without other features and elements. Sub-elements of the methods and features described above with reference to FIGS. 1-15 may be performed in any arbitrary order (including concurrently), in any combination or sub-combination.

What is claimed is:

1. A virtual cinematography system (SmartVCS) comprising:
    a first mobile tablet device including a touch-sensor screen, a first hand control, a second hand control, and a motion sensor;
    a motion tracking camera configured to track and record movements of the motion sensor and generate motion tracking information to navigate a virtual camera; and
    a computer operatively coupled to the motion tracking camera that is configured to receive from the motion tracking camera data of the motion tracking information and transmit the data to the first mobile tablet device; and
    wherein the first mobile tablet device is configured to generate and overlay virtual camera images based on the motion tracking information data onto a virtual landscape and produce a virtual motion capture.

2. The virtual cinematography system of claim 1, wherein the computer is configured to receive motion tracking information from a second mobile device and to transmit motion tracking information of the second mobile device to the first mobile tablet device, wherein the first tablet mobile device is configured to overlay the motion tracking information of the second mobile device and the first mobile tablet device onto the virtual landscape.

3. The virtual cinematography system of claim 1, wherein the first and second hand controls are analog controls that are capable of mimicking track, dolly, boom, and pan movements of non-virtual cameras in real motion picture shooting.

4. The virtual cinematography system of claim 1, wherein tracking sensitivity of the first and second hand controls are adjustable.

5. The virtual cinematography system of claim 1, wherein different lenses for virtual camera images may be selected and applied.

6. The virtual cinematography system of claim 1, wherein aspect ratios for the virtual camera images are adjustable.

7. The virtual cinematography system of claim 1, wherein the virtual motion capture as recorded by the SmartVCS are saved locally on the mobile tablet device or imported into a commercially available 3-D graphics software installed in a computer for modification.

8. A virtual cinematography system (SmartVCS) comprising:
    a first mobile tablet device including a touch-sensor screen, a first hand control, a second hand control, and a motion sensor; and
    a motion tracking camera operatively coupled to a game console and configured to track and record movements of the motion sensor and produce motion information to navigate a virtual camera,
    wherein the game console transmits the motion information data to the first mobile tablet,
    wherein the first mobile tablet is configured to generate and overlay virtual camera images based on the motion information data onto a virtual landscape and produce a virtual motion capture.

9. The virtual cinematography system of claim 8, wherein the game console is configured to receive motion tracking information from a motion sensor for a second mobile device and to transmit motion tracking information of the second mobile device to the first mobile tablet device, wherein the first tablet mobile device is configured to overlay the motion tracking information of the second mobile device and the first mobile tablet device onto the virtual landscape.

10. The virtual cinematography system of claim 8, wherein the first and second hand controls are analog controls that are capable of mimicking track, dolly, boom, and pan movements of non-virtual cameras in real motion picture shooting.

11. The virtual cinematography system of claim 8, wherein tracking sensitivity of the first and second hand controls are adjustable.

12. The virtual cinematography system of claim 8, wherein different lenses for virtual camera images may be selected and applied.

13. The virtual cinematography system of claim 8, wherein aspect ratios for the virtual camera images are adjustable.

14. The virtual cinematography system of claim 8, wherein the virtual motion capture as recorded by the SmartVCS are saved locally on a mobile tablet device or imported into a commercially available 3-D graphics software installed in a computer for modification.

15. The virtual cinematography system of claim 8, wherein
    wherein the first mobile tablet and the game console are configured to connect to a server, and the game console transmits the motion information data across a server via direct IP connection for streaming of the motion information tracked by the camera to the first mobile tablet.

16. A method of producing a virtual motion capture using a SmartVCS (Virtual Cinematography System) device, the method comprising: pre-loading and launching a standalone SmartVCS application into a first mobile tablet device of the SmartVCS device including a first hand control, a second hand control and a motion sensor; tracking a movement of the motion sensor of the SmartVCS device via a motion tracking camera connected to a game console to produce motion information data; transmitting the motion information data from the game console to the first mobile tablet device; operating a virtual camera within the SmartVCS application based upon the motion information data so as to navigate a virtual camera in a virtual 3-D landscape according to the motion sensor; and recording a virtual motion capture including the virtual camera motion.

17. The method of claim 16, wherein the recorded virtual motion capture is saved locally on the first tablet device or imported into a production software on a computer for playback editing and approval.

18. The method of claim 16, wherein the transmission of the motion information data is done by streaming across a server via direct IP connection from the game console to the first mobile tablet device.

19. The method of claim 16, wherein the game console is configured to receive motion tracking information from a motion sensor for a second mobile device and to transmit motion tracking information of the second mobile device to the first mobile tablet device, wherein the first tablet mobile device is configured to overlay the motion tracking information of the second mobile device and the first mobile tablet device onto the virtual landscape.

\* \* \* \* \*